(12) United States Patent
Schubert et al.

(10) Patent No.: US 7,162,340 B2
(45) Date of Patent: Jan. 9, 2007

(54) VEHICLE ROLLOVER DETECTION AND METHOD OF ANTICIPATING VEHICLE ROLLOVER

(75) Inventors: Peter J. Schubert, Carmel, IN (US); Jan K. Schiffmann, Newbury Park, CA (US)

(73) Assignee: Delphi Technologies, Inc., Troy, MI (US)

( * ) Notice: Subject to any disclaimer, the term of this patent is extended or adjusted under 35 U.S.C. 154(b) by 243 days.

(21) Appl. No.: 10/754,113

(22) Filed: Jan. 8, 2004

(65) Prior Publication Data

US 2005/0154512 A1    Jul. 14, 2005

(51) Int. Cl.
   *B60G 17/016*    (2006.01)
(52) U.S. Cl. ............................ 701/38; 701/35; 701/36; 340/440
(58) Field of Classification Search ................. 701/36, 701/38, 45, 35, 65–66, 72; 280/756; 180/252, 180/282; 340/440
   See application file for complete search history.

(56) References Cited

U.S. PATENT DOCUMENTS

| | | | |
|---|---|---|---|
| 5,521,580 A | 5/1996 | Kaneko et al. ............. 340/439 |
| 5,714,947 A | 2/1998 | Richardson et al. ........ 340/903 |
| 5,790,970 A | 8/1998 | Brachert et al. ............. 701/70 |
| 5,825,284 A | 10/1998 | Dunwoody et al. ......... 340/440 |
| 5,832,402 A | 11/1998 | Brachert et al. ............. 701/72 |
| 5,952,730 A | 9/1999 | Haller et al. .................. 307/10 |
| 6,002,974 A | 12/1999 | Schiffmann .................. 701/36 |
| 6,002,975 A | 12/1999 | Schiffmann et al. ......... 701/36 |
| 6,170,594 B1 * | 1/2001 | Gilbert ........................ 180/282 |
| 6,223,114 B1 | 4/2001 | Boros et al. .................. 701/70 |
| 6,225,894 B1 | 5/2001 | Kyrtsos ...................... 340/440 |
| 6,282,474 B1 | 8/2001 | Chou et al. .................... 701/45 |
| 6,301,536 B1 | 10/2001 | Vaessen et al. ............... 701/45 |
| 6,314,342 B1 | 11/2001 | Kramer et al. ................. 701/1 |
| 6,332,104 B1 | 12/2001 | Brown et al. .................. 701/1 |
| 6,424,907 B1 | 7/2002 | Rieth et al. ................. 701/124 |
| 6,430,506 B1 | 8/2002 | Mon et al. .................. 701/301 |
| 6,487,500 B1 | 11/2002 | Lemelson et al. .......... 701/301 |
| 6,496,759 B1 | 12/2002 | Mattes et al. .................. 701/1 |
| 6,496,763 B1 | 12/2002 | Griessbach .................. 701/45 |
| 6,507,016 B1 | 1/2003 | Cooper ..................... 250/231 |
| 6,542,792 B1 | 4/2003 | Schubert et al. ............... 701/1 |
| 6,556,908 B1 | 4/2003 | Lu et al. ....................... 701/38 |
| 6,560,519 B1 | 5/2003 | Williams et al. ............. 701/45 |
| 6,584,388 B1 | 6/2003 | Schubert et al. ............. 701/46 |
| 6,654,671 B1 * | 11/2003 | Schubert ....................... 701/1 |
| 2003/0055549 A1 | 3/2003 | Barta et al. | |

(Continued)

FOREIGN PATENT DOCUMENTS

EP    1 312 515    5/2002

*Primary Examiner*—Gertrude A. Jeanglaude
(74) *Attorney, Agent, or Firm*—Jimmy L. Funke

(57) ABSTRACT

A rollover detection apparatus and method are provided for anticipating a potential vehicle rollover event. The apparatus includes an input for receiving a plurality of input signals including sensed parameters of the vehicle. A first memory buffer stores data representative of one or more predetermined driving scenarios that represent possible rollover scenarios. A second memory buffer stores data representative of a history of recent conditions of the vehicle based on the plurality of sensed vehicle parameters. The apparatus further includes a processor for comparing the data representative of a history of recent driving events to the data representative of one or more predetermined driving scenarios. The processor further determines a possible rollover event of the vehicle based on the comparison and generates an output signal indicative thereof.

14 Claims, 6 Drawing Sheets

U.S. PATENT DOCUMENTS

2003/0093201 A1    5/2003   Schubert et al. .............. 701/46
2003/0158633 A1    8/2003   Schubert et al. ............... 701/1

* cited by examiner

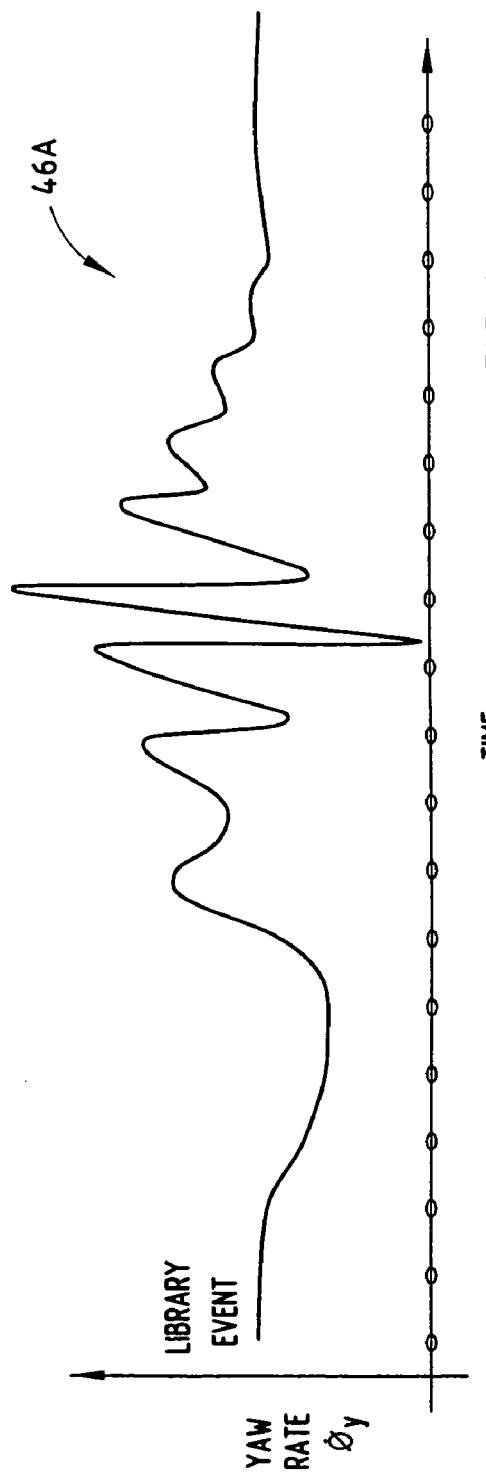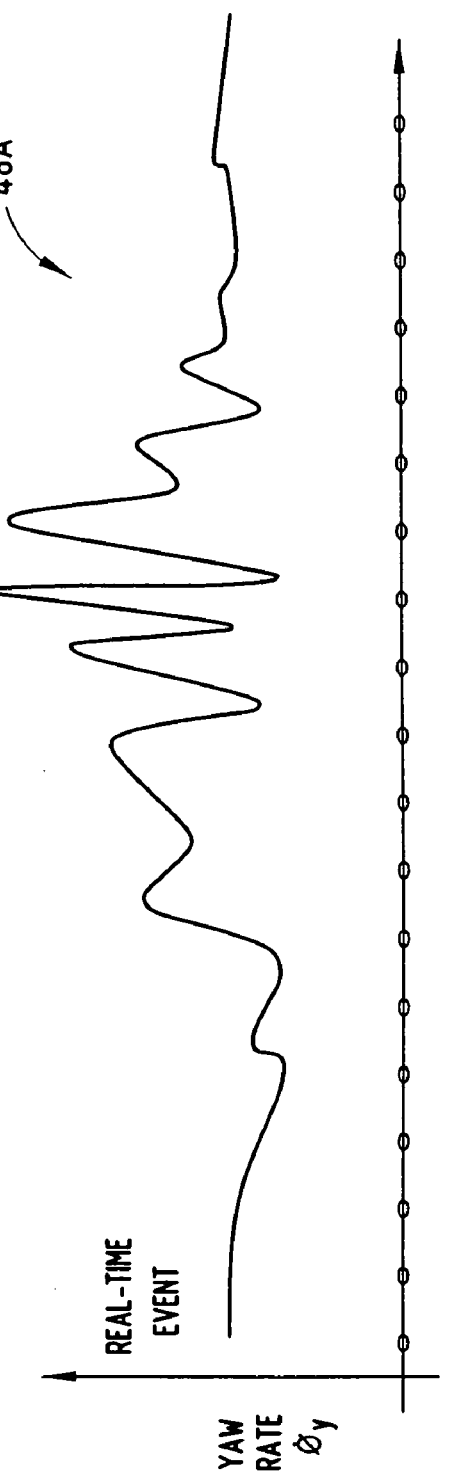

VEHICLE ROLLOVER DETECTION AND METHOD OF ANTICIPATING VEHICLE ROLLOVER

TECHNICAL FIELD

The present invention generally relates to vehicle rollover detection and, more particularly, to an apparatus and method of anticipating a potential vehicle rollover event.

BACKGROUND OF THE INVENTION

Automotive vehicles are increasingly equipped with on-board restraint devices that deploy in the event that the vehicle rolls over in an attempt to provide added protection to occupants of the vehicle. For example, a pop-up roll bar can be deployed to extend vertically outward to increase the height of support provided by the roll bar upon detecting an anticipated vehicle rollover event. Additionally, many vehicles are typically equipped with multiple air bags, side curtains, and seatbelt pretensioners. These and other restraint devices generally require timely deployment to mitigate adverse effects to occupants in the vehicle. To achieve timely deployment of many restraint devices, the dynamic motion of the vehicle must be monitored and a decision must be made to determine whether a vehicle rollover is anticipated.

Various single sensor and multiple sensor rollover detection modules have been employed in vehicles to sense the static and dynamic conditions of the vehicle and to further predict an anticipated vehicle rollover. Some sophisticated vehicle rollover sensing approaches employ discrimination algorithms implemented in a controller to process sensed vehicle motion and determine an anticipated vehicle overturn condition in the future. This enables the advanced deployment of restraint devices, at least in some situations. In several vehicle driving scenarios, a vehicle rollover becomes a secondary crash, or is a result of severe out-of-control driving. As a consequence, occupants are often moved out of their normally-seated positions prior to the onset of significant vehicle roll. An out of position occupant may experience less favorable mitigation to injuries since most deployable restraint devices are generally designed for use with normally-seated occupants.

It is therefore desirable to anticipate a potential vehicle rollover event sufficiently early to allow remedial action to be taken, such as deploying one or more restraint devices and/or controlling vehicle functions.

SUMMARY OF THE INVENTION

In accordance with the teachings of the present invention, a rollover detection apparatus and method are provided for anticipating a potential vehicle rollover event. According to one aspect of the present invention, the apparatus includes an input for receiving a plurality of input signals including sensed parameters of the vehicle. A first memory buffer stores data representative of one or more predetermined driving scenarios that represent possible vehicle rollover scenarios. A second memory buffer stores data representative of a history of recent conditions of the vehicle based on the plurality of sensed vehicle parameters. The apparatus further includes a processor for comparing the data representative of a history of recent driving events to the data representative of one or more predetermined driving scenarios. The processor further determines an anticipated rollover event of the vehicle based on the comparison and generates an output signal indicative thereof.

According to another aspect of the present invention, a method of anticipating a possible rollover event of a vehicle is provided. The method includes the steps of storing in memory data representative of one or more predetermined driving scenarios that represent possible vehicle rollover scenarios, receiving a plurality of vehicle parameters indicative of the driving condition of the vehicle, and storing in memory data representative of a history of recent driving events. The method also includes the step of comparing the data representative of a history of recent driving events to the data representative of one or more predetermined driving scenarios. The method further includes the steps of determining an anticipated vehicle rollover event based on the comparison, and generating an output signal indicative of an anticipated vehicle rollover event.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which:

FIG. 4 is a graph illustrating trained data stored in memory representing a predetermined driving scenario for a possible vehicle rollover event;

FIG. 5 is a graph illustrating a recent history of data for a vehicle driving event that is stored in memory.

DESCRIPTION OF THE PREFERRED EMBODIMENTS

Figure 1:
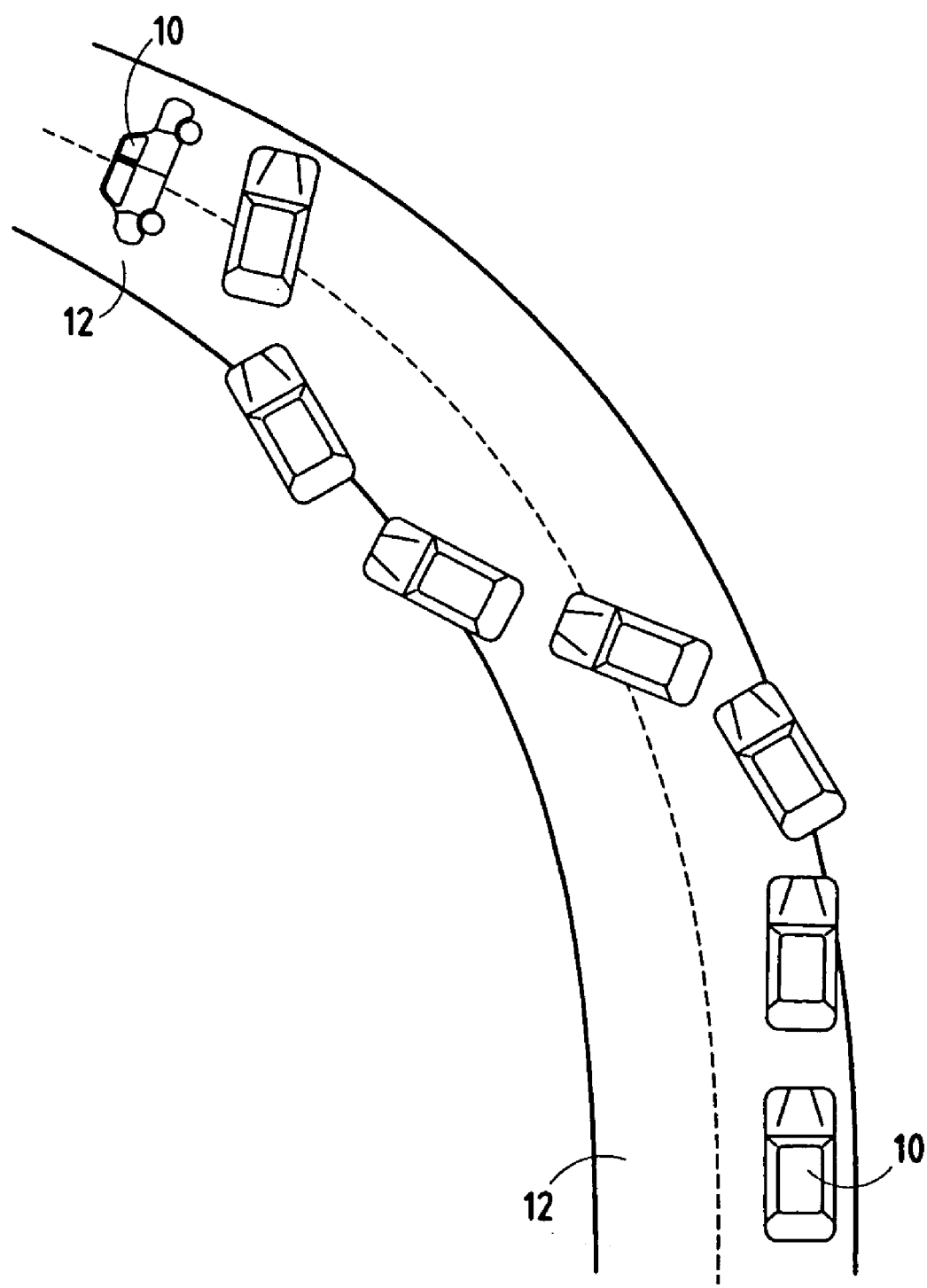
FIG. 1 illustrates a driving scenario of a vehicle experiencing loss of positive traction with the roadway.

Referring to FIG. 1, a vehicle 10 is generally illustrated in an exemplary driving scenario which may lead to a high probability of a vehicle rollover. In this scenario, a drowsy, distracted, or inexperienced driver may drive the vehicle such that it drifts off the roadway surface, shown at the start of the bend of the roadway 18. When the tires of the vehicle 10 catch on the shoulder of the roadway 18, which is generally softer than the pavement, the driver of the vehicle 10 may become startled, and may respond by steering severely in an attempt to realign the vehicle 10 on the roadway 18. In this scenario, the vehicle 10 is redirected to the opposite side of the roadway 18 at a steeper angle of approach. Then, the driver may reverse the steering direction, as shown by over-correcting the vehicle 10 for the second time. At this point, the vehicle 10 is oriented at a significant angle to the original direction of motion along roadway 10. The high roadway surface friction, tire debeading, and/or a possibility of encountering a tripping obstacle can then result in a high probability of a rollover event as shown in the last view of the vehicle 10.

To handle the aforementioned driving scenario and other vehicle driving scenarios that may lead to a possible vehicle rollover event, the present invention employs an anticipatory rollover indicator to anticipate, with relatively high likelihood, the possibility of a vehicle rollover event. The anticipatory rollover indicator is shown and described herein in connection with a vehicle rollover module. However, it should be appreciated that the anticipatory rollover indicator may be employed to anticipate a future rollover event in any of a number of modules and applications. For example, the anticipatory rollover indicator may be employed as an input to a rollover discrimination algorithm to modify sensitivity of the rollover discrimination algorithm or to enter a new state or mode where the balance between early deployment decisions and non-rollover immunity can be adjusted to favor early deployment of restraint devices. The anticipatory rollover indicator output could otherwise be employed to perform a safing function, or enhance sensitivity of a restraint device by providing a hyper-tensioner or higher-powered seatbelt pretensioner in an attempt to maintain position of an occupant relative to one or more restraint devices. Further, the anticipatory rollover indicator output may be employed in vehicle stability control systems in an attempt to minimize or avoid an anticipated vehicle rollover event in the future.

Figure 2:
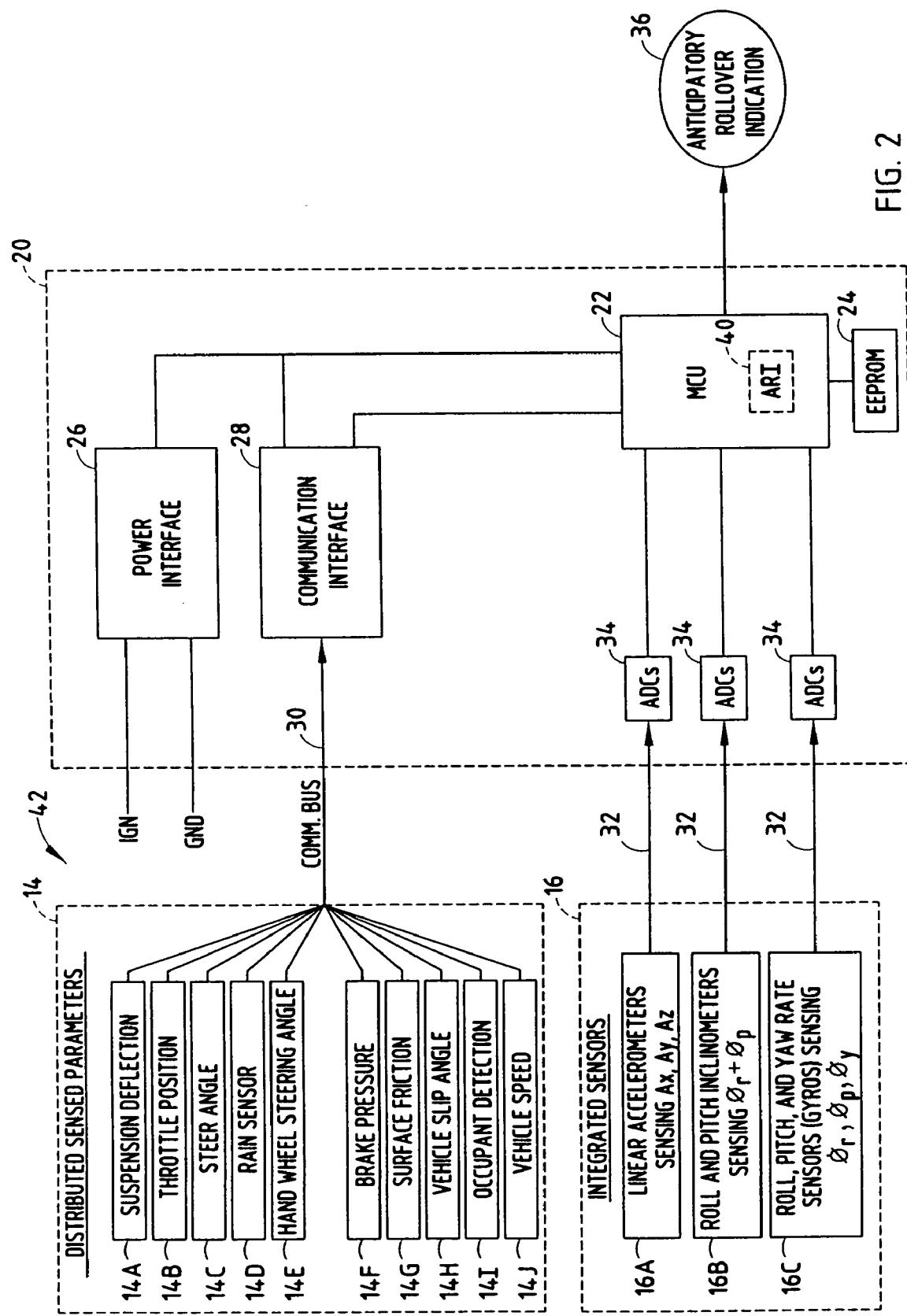
FIG. 2 is a block diagram of a rollover detection apparatus including an anticipatory rollover indicator for anticipating a potential future rollover event according to the present invention.

Referring to FIG. 2, a rollover sensing module 20 is generally illustrated for use in sensing vehicle dynamics and detecting a rollover condition of the vehicle 10. The rollover sensing module 20 includes an anticipatory rollover indicator, implemented in software according to the embodiment shown, for generating an anticipatory rollover indication output signal 36. The anticipatory rollover indication output signal 36 may be employed in various applications, including vehicle rollover detection and vehicle stability control.

The rollover sensing module 20 includes a microprocessor control unit (MCU) 22 for processing sensed vehicle parameters according to an anticipatory rollover indication (ARI) routine 40, according to the present invention. MCU 22 may employ a microprocessor-based controller and, according to one example, may include Model No. 68HC, commercially available from Motorola. Associated with MCU 22 is an electrically erasable programmable read-only memory (EEPROM) 24 that stores various program calibrations including the anticipatory rollover indication routine, as explained herein. The EEPROM 24 can be integrated with the MCU 22 or provided external thereto.

The rollover sensing module 20 also includes a power interface 26 for receiving a voltage supply, shown as the vehicle ignition (IGN) voltage potential, and ground (GND). The power interface 26 supplies electrical power to the various electrical components of the apparatus 20, including a communication interface 28 and the MCU 22. The communication interface 28 allows for data communication with various sensing devices and modules within the vehicle. The communication bus 30 serves as an input to supply a plurality of distributed sensed vehicle parameters 14.

The communication interface 28 is shown receiving various input signals containing sensed vehicle parameters 14 via input vehicle communication bus 30. The distributed sensed vehicle parameters 14 include a suspension deflection signal 14A, a throttle position signal 14B, a steering angle signal 14C, a rain sensor signal 14D, a hand wheel steering angle signal 14E, a brake pressure signal 14F, a surface friction signal 14G, a vehicle slip angle signal 14H, an occupant detection signal 14I, and a vehicle speed signal 14J. It should be appreciated that any of a number of distributed sensed vehicle parameters 14 that are available on the vehicle may be supplied to the MCU 22 via the input 30 and communication interface 28. The distributed sensed signals 14 input via input 30 are not limited to those shown in FIG. 2.

The MCU 22 is also connected to a plurality of integrated sensors 16 which are dedicated to sensing dynamic and static conditions of the vehicle. The integrated sensors 16 includes three linear accelerometers for sensing linear longitudinal acceleration $A_x$ along the longitudinal axis of the vehicle, lateral acceleration $A_y$ along the lateral axis of the vehicle, and vertical accelerator $A_z$ along the vertical axis of the vehicle, as shown in block 16A. Additionally, the integrated sensors 16 include roll and pitch inclinometers shown in block 16B for sensing the roll angle $\phi_r$ and pitch angle $\phi_p$ of the vehicle. Further, the integrated sensors 16 include angular rate sensors (gyros) for sensing roll rate $\phi_r$, pitch rate $\phi_p$, and yaw rate $\phi_y$ of the vehicle, as shown in block 16C.

The integrated sensors 16 may be mounted within or external to the rollover sensing module 20. Each of the integrated sensor outputs is supplied as inputs 32 to an analog-to-digital converter (ADC) 34 for converting the analog sensed signals to digital signals. While three linear accelerometers, two inclinometers, and three angular rate sensors are shown and described herein as sensors 16, it should be appreciated that any of a number of various sensors may be employed to provide input signals 32 to MCU 22 for use in the anticipatory rollover indicator according to the present invention. Together, the distributed sensed parameters 14 and sensor inputs 32 provide a plurality of inputs 42 that are processed to anticipate a vehicle rollover.

Figure 3:
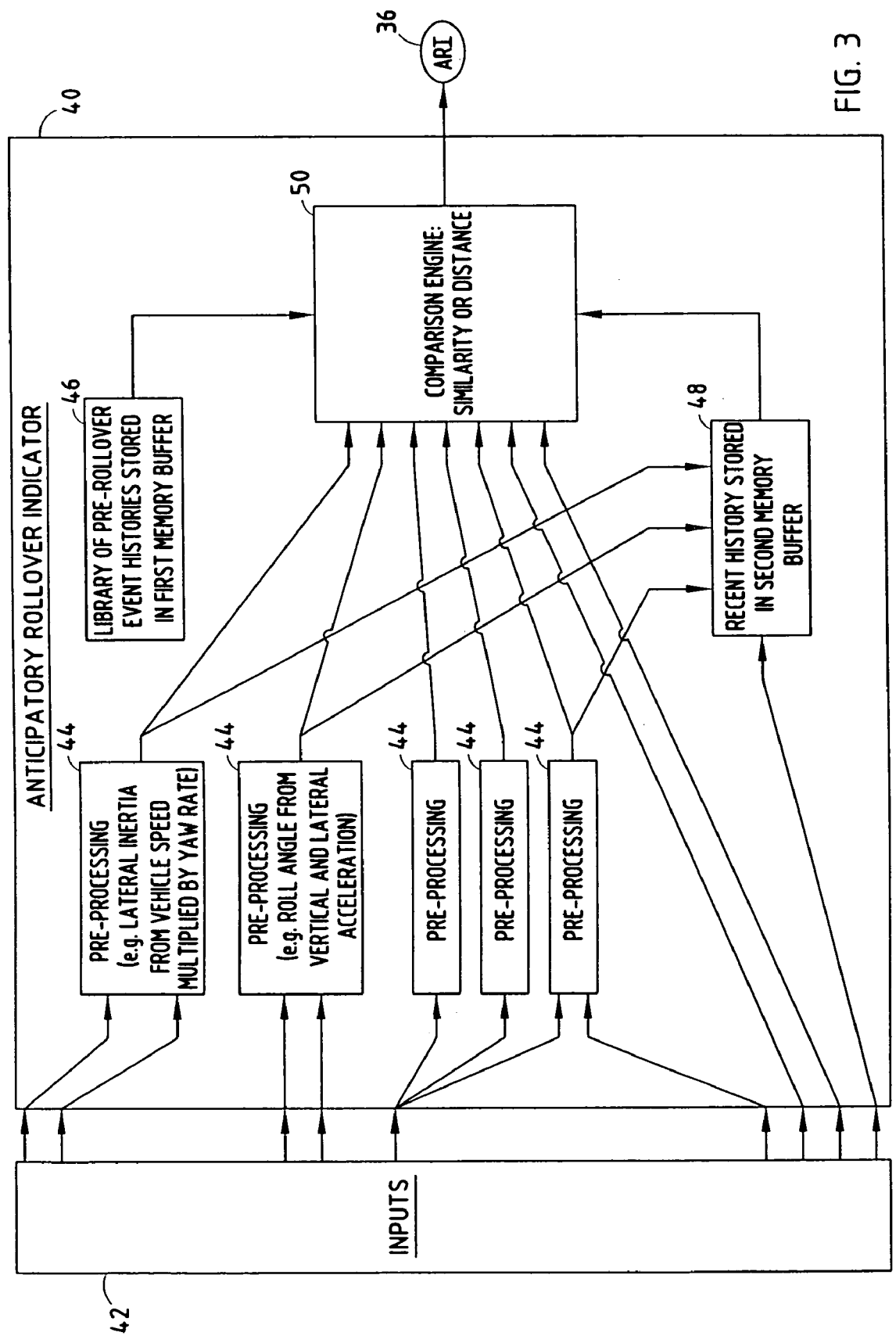
FIG. 3 is a block diagram further illustrating the anticipatory rollover indicator.

Referring to FIG. 3, the vehicle parameter input signals and integrated signals, generally shown as inputs 42, are supplied to the anticipatory rollover indicator 40. The anticipatory rollover indicator 40 may be implemented by a microprocessor in the rollover detection module, or may be implemented by any other analog or digital processor (e.g., controller), according to the teachings of the present invention. At least some of the inputs 42 are shown subjected to pre-processing 44. It should be appreciated that any one or more of the inputs 42 may be pre-processed. The pre-processing 44 may include standard signal processing techniques such as low-pass filtering to reduce noise and prevent aliasing of digitally-sampled signals. The pre-processing 44 may include high-pass filters to remove slow-varying or constant bias levels present in one or more sensors.

Additionally, the pre-processing 44 may include combining two or more input signals to derive a further measurement or parameter related to vehicle dynamics, driver commands, or sub-system states of the vehicle. According to one example shown, the pre-processing 44 may include multiplying vehicle forward speed by vehicle yaw rate to obtain the centripetal acceleration of the vehicle caused by inertial forces during a flat turn. According to another example shown, the pre-processing 44 may include processing the vertical and lateral acceleration signals to produce an estimate of vehicle roll angle. It should be appreciated that there may be subsequent pre-processing performed, such as using the above-described centripetal acceleration to modify the above-described lateral acceleration to provide a more accurate estimate of vehicle roll angle.

Various other pre-processing operations 44 may be performed, which should be readily apparent to those skilled in the art. Other pre-processing operations 44 may include the counting of steering reversals by the driver, which may be a common feature of maneuver-induced single-vehicle rollovers. The level of braking applied by the driver may also indicate a panic state of a driver, and may be applied with slip velocity of the tires to indicate a potential sideways skid of the vehicle, since many types of vehicle rollover requires some degree of lateral movement. Subsystems within the vehicle may also provide inputs, such as vehicle stability control, vehicle dynamics control, electronic braking or steering, and ride leveling. These and other inputs can be used as flags or indicators or can be combined logically in pre-processing operations 44 to generate metrics useful for determining the likelihood of a potential vehicle rollover, according to the present invention.

The anticipatory rollover indicator 40 includes a library 46 of pre-rollover event history data stored in a first memory buffer. The pre-rollover event history data includes data representative of one or more potential vehicle rollover scenarios, such as a data record of centripetal acceleration in a ten second time period prior to a vehicle rollover. Any of a number of one or more signals or pre-processed parameters, whether instantaneous or as a time sequence of values, may be stored as part of the library data of pre-rollover event histories. The pre-rollover event histories may include individual data points, or may include further abstractive measures, such as peak values, the number of zero crossings, average values, standard deviations, and/or other such mathematical metrics as should be evident to those skilled in the art.

The anticipatory rollover indicator 40 also includes a recent history of data 48 stored in a second memory buffer. The second memory buffer may be implemented as a circular buffer with a pointer that scans over a memory array, and returns to the first position after exiting the last position of the memory buffer. The second memory buffer may be dynamic, or variable, may be first-in first-out shift registers, and may resettable from either an external signal or via suitable logic within the anticipatory rollover indicator 40. The second memory buffer serves to store the recent history of input signals and pre-processed signals. For example, a circular buffer may store the most recent ten seconds of centripetal acceleration, or other input parameters, as a series of values sampled every one hundred milliseconds (total of one hundred samples). The stored sample data are then made available as data for comparison in a comparison engine 50.

The library of pre-rollover event history data 46 may include trained data obtained from one or more driving scenarios that generate a near rollover event. For example, a monitored test vehicle may be driven to the point where near rollover conditions are experienced. The monitored data may be saved as pre-rollover event history data indicative of a vehicle rollover scenario.

The comparison engine 50 receives the library of pre-rollover event history data 46 and the recent data history 48 as stored in memory, and compares the stored data representative of driving trained histories with the recent sensed history data, and determines if an anticipated vehicle rollover is projected. The comparison engine 50, which is shown and described herein as an algorithm implemented by the microprocessor-based MCU, performs a pattern-matching routine to compare the monitored recent history data 48 with data histories of one or more predetermined rollover events 46. The comparison performed by comparison engine 50 may be achieved according to three embodiments discussed hereinafter.

According to the first embodiment the comparison engine 50 employs a difference measurement algorithm to measure the difference between the data representative of a recent history of driving events and the data representative of one or more pre-trained vehicle driving scenarios. One example of a pre-trained library of data for a potential upcoming rollover scenario is shown In FIG. 4, in which data within a pre-rollover driving event is illustrated by yaw rate $\phi_y$ in curve 46A. In comparison, a recent data history of measured yaw rate $\phi_y$ is illustrated in curve 48A shown in FIG. 5. Using the difference measurement algorithm approach, the algorithm compares curve 46A to curve 48A and provides a continuous output related to the distance (numerical difference or degree of matching) between curves 46A and 46B. Alternately, the distance/matching can be compared to a threshold or multiplicity of thresholds, and the output of the difference measurement algorithm could be the setting of a Boolean flag or an integer number on a scale of rollover likelihood. In this way, the anticipatory rollover indicator algorithm can be used to deploy restraint devices, such as a resettable belt pretensioner, or it can be used to modify the discrimination logic of a rollover sensing algorithm.

According to the second embodiment, the comparison engine 50 employs a Hidden Markov Model (HMM), such as a type which is known to be employed for matching protein sequences in biology or for matching phoneme sequences in voice recognition. The use of an HMM involves first training the model with a set of pre-recorded sequences. The HMM comparison engine embodiment generates template libraries of data in an internal format. These template libraries are then compared to a sequence of new data in real-time such as a ten second window of centripetal acceleration, and a degree of matching is determined by the HMM comparison engine. Thus, the library of pre-rollover event data histories may also include HMM internal format sequence libraries.

In HMM pattern matching, there may be single points within the sequence which are very different from other points. Yet, if most of the points are closely matched, and the sequence ahead of and behind the single mismatched points are similar, then the HMM will return a variable metric for the match. However, because HMMs are compute-intensive, they may not be well suited for certain applications. In such situations, a more straightforward method of comparing two time sequences may be achieved by using the distance measurement approach. Distance in this sense is multi-dimensional, with each point of the sequence representing its own dimension. Each point of data in a library event is matched with the real-time history of the on-going driving scenario, and a distance value is computed. If the two sequences have a small distance measurement, they may be considered to match well.

According to a third embodiment, the comparison engine 50 may employ a Support Vector Machine (SVM) and other techniques of pattern matching as should be evident to those in the art. The Support Vector Machine and other such techniques may employ a predetermined format for storing data in the library. Further, it should be appreciated that a combination of any of the distance measurement, Hidden Markov Models, and Support Vector Machines, or variations of one another, may be employed to perform the comparison of the library data of pre-rollover events to the recent history data in order to determine an anticipated rollover indication according to the present invention.

Several distance measurements may be employed by the comparison engine, according to the distance measurement approach. Examples of methods of computing distance for use in the distance measurement embodiment may include one of the following equations:

Euclidean Equation:

$$D(x, y) = \sqrt{\sum_{i=1}^{m}(x_i - y_i)^2}$$

Correlation Equation:

$$D(x, y) = \frac{\sum_{i=1}^{m}(x_i - \overline{x_i})(y_i - \overline{y_i})}{\sqrt{\sum_{i=1}^{m}(x_i - \overline{x_i})^2 \sum_{i=1}^{m}(y_i - \overline{y_i})^2}}$$

The output distance is provided by D(x, y), as a direct measurement of data matching, wherein $x_i$ is the library of predetermined data, and $y_i$ is the recent history of data. In either equation, the variable m is the number of samples of data. Additionally, variable $\overline{x_i}$ is the average (mean) value for attribute i occurring in the library of prerecorded data, and $\overline{y_i}$ is the average (mean) value for attribute i occurring in the recent history of data.

When using the distance measurement embodiment, the output distance D(x, y) is a direct measure of data matching. This distance D(x, y), or rather an inverse function of distance, is the output indicating the degree to which a given driving scenario may lead to a vehicle rollover. In this way, whether HMM, SVM, or distance measurement embodiments are employed, the comparison engine 50 provides an output which is indicative of a vehicle rollover to a certain degree or probability.

Figure 6A:
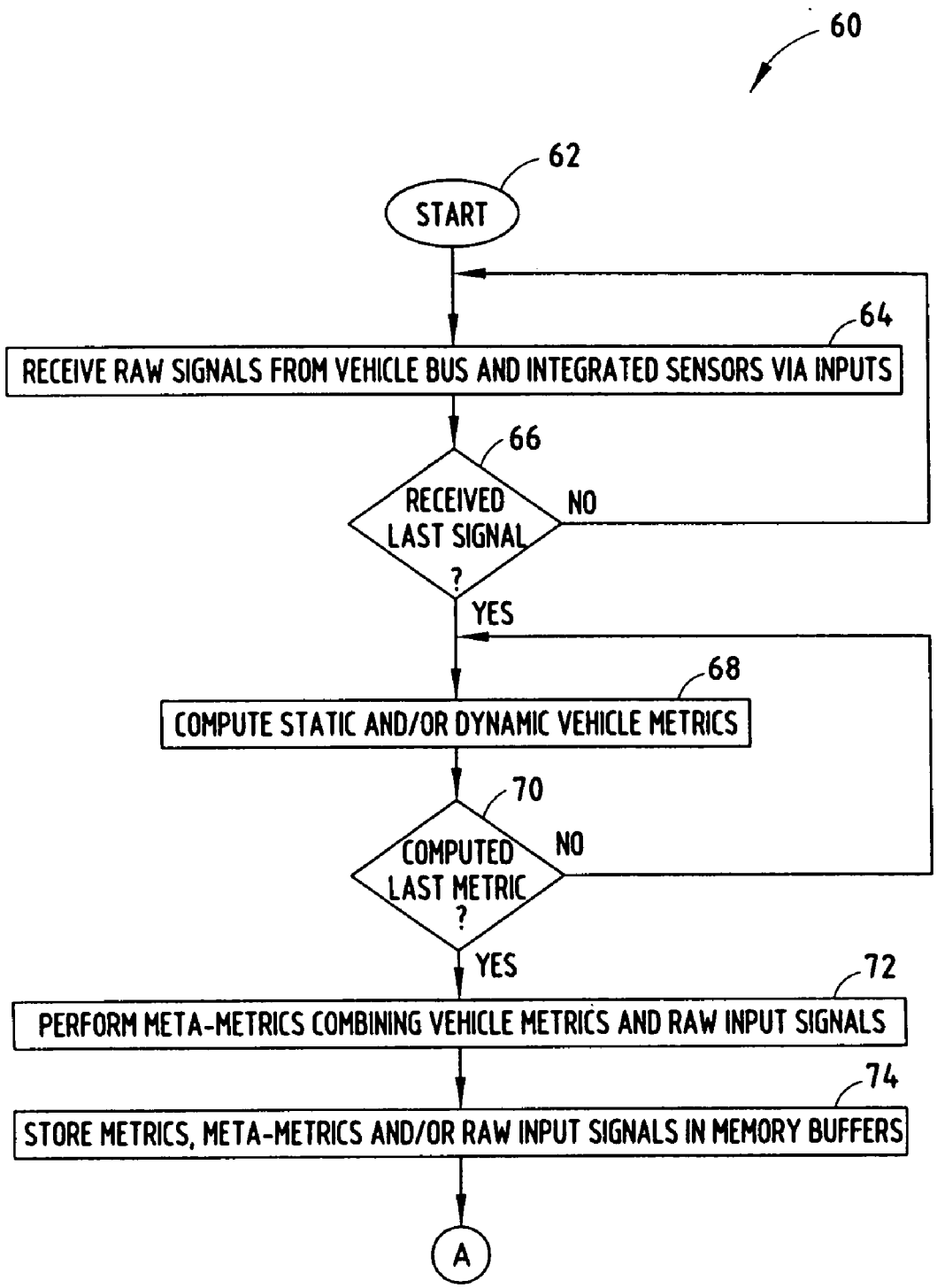
FIG. 6 is a flow diagram illustrating a methodology for determining an anticipated future rollover event of a vehicle employing the anticipatory rollover indicator of the present invention.
Figure 6B:
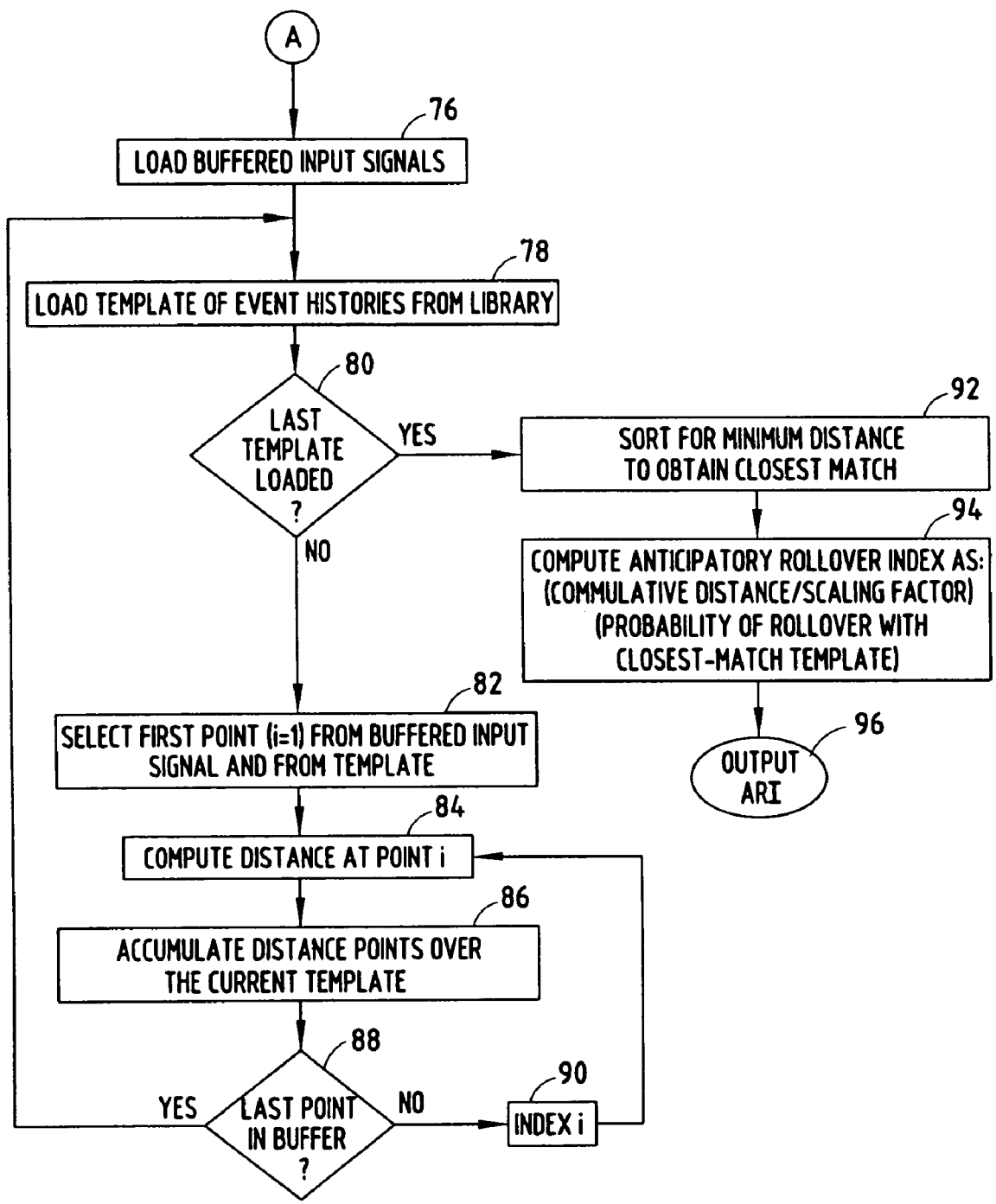

Referring to FIGS. 6A and 6B, a method 60 of anticipating a rollover condition of a vehicle is illustrated therein. Method 60 begins at step 62 and proceeds to receive raw input signals from the vehicle data communication bus and integrated sensors via the inputs in step 64. The various inputs are received until the decision step 66 determines that the last signal has been received. Next, method 60 computes static and/or dynamic vehicle metrics in step 68. The static and dynamic vehicle metrics may include pre-processing as described herein. The computation of static and/or dynamic vehicle metrics occurs until the last metric has been computed as determined by decision step 70.

Following computation of the metrics, method 60 proceeds to perform meta-metrics combining vehicle metrics and raw input signals in step 72. Next, in step 74, method 60 stores the metrics, meta-metrics, and/or raw input signals in memory buffers. The buffered input signals are then loaded into memory in step 76. Likewise, the template of event data histories from the library are loaded into memory in step 78. Method 60 includes decision step 80 which checks if the last template has been loaded. If the last template has not yet been loaded, method 60 proceeds to step 82 to select a first point i=1 from the buffered input signal and from the template. Thereafter, in step 84, method 60 computes the distance at point i between the recent monitored driving data and the pre-trained library data. The distance points over the current template are then accumulated in step 86. Decision step 88 determines if the point considered is the last point in the memory buffer and, if not, indexes point i to the next point value and returns to step 84. Once the last point in the memory buffer has been reached, routine 60 returns to step 78.

Once the last template has been loaded as determined by decision step 80, method 60 proceeds to step 92 to sort for minimum distance to obtain the closest match between the pre-trained data history in the library and the recent monitored driving event data. In step 94, method 60 computes an anticipatory rollover index. The anticipatory rollover index is computed as a function of cumulative distance divided by the scaling factor, and multiplied by a probability of rollover with the closest-match template. It should be appreciated that scaling factor and the probability of rollover may be selected depending upon the level of probability that is desired to be achieved with the anticipatory rollover indicator of the present invention.

The computed anticipatory rollover index is then employed to generate an output anticipatory rollover indication in step 96. Accordingly, the anticipatory rollover indication method 60 anticipates a possible rollover of the vehicle.

The output anticipatory rollover indication signal can be used in a variety of ways. For example, the anticipatory rollover indication output can be compared against a preset threshold and then used to deploy a resettable restraint device in a vehicle, such as a seat belt pretensioner. The anticipatory rollover indicator output may be used in a complex ride and handling control system as a flag to apply brakes and/or activate an active suspension component. The anticipatory rollover indication output may also be used to notify the driver of a potentially hazardous driving scenario. The anticipatory rollover indication output may further be used as an input to a rollover discrimination algorithm, to modify the sensitivity of the rollover algorithm, or to enter a new state or mode where the balance between early deployment decisions and non-rollover immunity can be adjusted to favor early deployment. These and other applications of the anticipatory rollover indication output may be employed to enhance the deployment of devices on a vehicle and the driving performance of the vehicle, by employing the anticipatory rollover indicator of the present invention.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The invention claimed is:

1. A rollover detection apparatus for detecting a potential rollover event for a vehicle, said apparatus comprising:
   an input for receiving a plurality of sensed input signals;
   a processor for deriving time-separated values of at least one variable parameter of the vehicle from the input signals;
   a first memory buffer storing at least one first data set representative of a predetermined plurality of time-separated values of the at least one variable parameter of the vehicle known to indicate a high probability of a vehicle rollover event;
   a second memory buffer storing a second data set representative of a recently derived plurality of the time-separated values of the at least one variable parameter of the vehicle over a predetermined time duration; and
   said processor further comparing the first and second data sets to determine a predetermined degree of data matching therebetween over the predetermined time duration, determining a possible rollover event of the vehicle based on the comparison and generating an output signal indicative thereof.

2. The rollover detection apparatus as defined in claim 1, wherein the input signals comprise acceleration and rate signals.

3. The rollover detection apparatus as defined in claim 2, wherein the input signals further comprise a sensed attitude angle of the vehicle.

4. The rollover detection apparatus as defined in claim 1, wherein the plurality of input signals comprise a plurality of vehicle parameters including vehicle speed and steering angle.

5. The rollover detection apparatus as defined in claim 1, wherein said processor employs a data difference measurement algorithm to compare the first and second data sets to determine a predetermined degree of data matching therebetween.

6. The rollover detection apparatus as defined in claim 1, wherein the processor comprises a Hidden Markov Model to compare the first and second data sets to determine a predetermined degree of data matching therebetween.

7. The rollover detection apparatus as defined in claim 1, wherein the processor comprises a Support Vector Machine for comparing the first and second data sets to determine a predetermined degree of data matching therebetween.

8. A method of anticipating a possible rollover event of a vehicle, said method comprising the steps of:

storing in memory a first data set representative of a predetermined plurality of time-separated values of at least one variable parameter of the vehicle, the first data set known to indicate a high probability of a vehicle rollover event;

receiving a plurality of input signals from which the at least one variable vehicle parameter may be derived and deriving therefrom a plurality of time-separated values of the at least one variable vehicle parameter for the vehicle;

storing in memory a second data set representative of the plurality of time-separated values of the at least one variable vehicle parameter for the vehicle over a predetermined time period derived from the input signals of recent driving events;

comparing the first data set to the second data set to determine if a predetermined degree of data matching exists between the first and second data sets over the predetermined time period;

determining a possible vehicle rollover event based on the comparison; and generating an output signal indicative of a possible vehicle rollover event.

9. The method as defined in claim 8 wherein the at least one variable vehicle parameter comprises at least one of vehicle acceleration and rate.

10. The method as defined in claim 9, wherein the at least one variable vehicle parameter comprises an attitude angle of the vehicle.

11. The method as defined in claim 8, wherein the input signals comprise vehicle speed and steering angle.

12. The method as defined in claim 8, wherein the step of comparing employs a data difference measurement algorithm to compare the first and second data sets to determine a predetermined degree of data matching therebetween.

13. The method as defined in claim 8, wherein the step of comparing is performed with a Hidden Markov Model.

14. The method as defined in claim 8, wherein the step of comparing is performed with a Support Vector Machine.

* * * * *